United States Patent [19]

Nakano et al.

[11] Patent Number: 4,571,220
[45] Date of Patent: Feb. 18, 1986

[54] WRAPPING TRANSMISSION

[75] Inventors: Takao Nakano, Takaishi; Shigemitsu Tochimori, Shiki, both of Japan

[73] Assignee: Nitta Beluto Kabushikikaisha, Osaka, Japan

[21] Appl. No.: 377,184

[22] Filed: May 11, 1982

[30] Foreign Application Priority Data

Dec. 21, 1981 [JP] Japan ................................ 56-207307

[51] Int. Cl.[4] .......................... F16H 7/18; F16G 1/04
[52] U.S. Cl. .................................... 474/100; 474/110; 474/111; 474/266; 474/267
[58] Field of Search .............. 474/85, 100, 101, 110, 474/111, 148, 266, 267, 268; 139/383 A; 198/847

[56] References Cited

U.S. PATENT DOCUMENTS

| | | | |
|---|---|---|---|
| 2,441,460 | 5/1948 | Walters | 474/266 X |
| 2,519,590 | 8/1950 | Mitchell | 474/267 |
| 2,696,678 | 12/1954 | Deck et al. | 474/85 X |
| 2,758,482 | 8/1956 | Lathrop et al. | 474/100 |
| 2,875,624 | 3/1959 | Lathrop et al. | 474/100 |
| 3,045,773 | 7/1962 | Sampietro | 474/100 X |
| 3,509,006 | 4/1970 | Baxendale et al. | 474/267 X |
| 3,724,284 | 4/1973 | Eng et al. | 474/267 X |
| 4,096,764 | 6/1978 | Richmond et al. | 474/268 X |
| 4,169,393 | 10/1979 | Wetzel et al. | 474/268 X |
| 4,355,994 | 10/1982 | Brew | 474/266 X |

FOREIGN PATENT DOCUMENTS

| | | | |
|---|---|---|---|
| 592376 | 2/1960 | Canada | 474/267 |
| 878075 | 9/1961 | United Kingdom | 474/100 |

Primary Examiner—William F. Pate, III
Assistant Examiner—Dwight G. Diehl
Attorney, Agent, or Firm—Armstrong, Nikaido, Marmelstein & Kubovcik

[57] ABSTRACT

A wrapping transmission for effectively providing a transmission power by means of a pressing force of a wrapping belt against a transmission belt which travels from a driving pulley to a driven pulley, without expanding the transmission belt to excess. The wrapping belt is a woven cloth, on at least its surface, having a reduced friction factor so that wear of the transmission belt decreases and frictional heat between the wrapping belt and the transmission belt is reduced, thereby minimizing the loss of transmission power.

10 Claims, 7 Drawing Figures

WRAPPING TRANSMISSION

BACKGROUND OF THE INVENTION

This invention relates to a wrapping transmission.

A wrapping transmission, comprising a driving pulley and a driven pulley engaging with a transmission belt, transmits a power from the driving pulley to the driven pulley by use of a frictional force generated between the belt and the pulleys. For the purpose of effective transmission of this power, efforts have been made to increase the friction factor of the belt or the tension of the belt by means of tension pulleys, thereby obtaining an increased frictional force between the belt and the pulleys. An increase of the friction factor of the belt results in excessive contact of the belt with the pulleys, during belt drive, so that the belt is gradually worn away, reducing the belt life. The residual powder produced by this friction between the belt and pulleys adheres to the surface of the belt, forming a rough surface on the belt which causes a noise in the belt drive. An increase of the belt tension by using a tension pulley results in an excessive expansion of the belt, which also causes a reduction of belt life.

SUMMARY OF THE INVENTION

The wrapping transmission of this invention which overcomes the abovediscussed disadvantages of the prior art comprises:

(1) a transmission belt, (2) a pair of pulleys, one of which is a driving pulley and the other of which is a driven pulley, which engage with the transmission belt, and (3) a means for pressing the back of the transmission belt at the portion, which comes into contact with the driving pulley, to the driving pulley; said pressing means having a plurality of guide pulleys, a wrapping belt which operably engages with the guide pulleys in such that a part of the wrapping belt contacts and presses the back of the transmission belt, and a means, connected to one of the guide pulleys, for adjusting a pressing force generated by the pressing of the wrapping belt to the transmission belt, thereby adjusting the pressing force of the transmission belt to the driving pulley.

The guide pulleys consist of, for example, three pulleys, two of which are symmetrically positioned about the line drawn through each center of both the driving pulley and the driven pulley and are on a line drawn through the center of the driving pulley, and the other of which is connected to the adjusting means, is positioned at an equal distance from each of said two guide pulleys. The adjusting means is a cylinder or a screw thread.

The wrapping belt is a woven cloth which contains natural fibers and synthetic fibers on at least its surface facing the transmission belt, and in which the natural fibers are exposed to a greater extent than the synthetic fibers.

Thus, the invention described herein makes possible the objectives of (a) providing a wrapping transmission which provides a desired tension for the transmission belt without expanding the transmission belt to excess, (b) providing a wrapping transmission in which power is effectively transmitted from the driving pulley to the driven pulley due to the pressing force of the wrapping belt against the transmission belt in spite of the small tension of the transmission belt, (c) providing a wrapping transmission in which, due to a use of the wrapping belt materials having a reduced friction, the friction between the wrapping belt and the transmission belt is so reduced that wear of the transmission belt is decreased, and (d) providing a wrapping transmission in which, due to a use of the wrapping belt materials having such a reduced friction, the frictional heat generated between the wrapping belt and the transmission belt is reduced so that loss of power is minimized.

BRIEF DESCRIPTION OF THE DRAWINGS

This invention may be better understood and its numerous objectives and advantages will become apparent to those skilled in the art by reference to the accompanying drawings as follows.

DESCRIPTION OF THE PREFERRED EMBODIMENTS

Figure 1A:
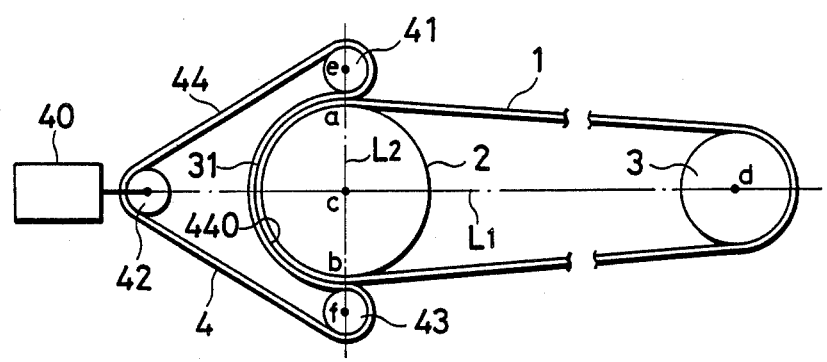
FIG. 1(a) is a front view of the wrapping transmission of this invention.
Figure 1B:
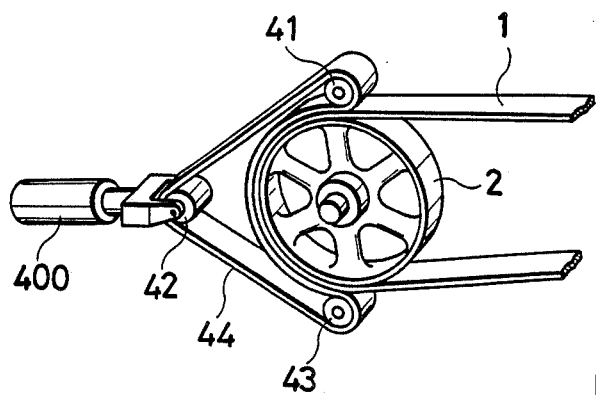
FIG. 1(b) is a perspective view of an adjusting means of this invention.
Figure 1C:
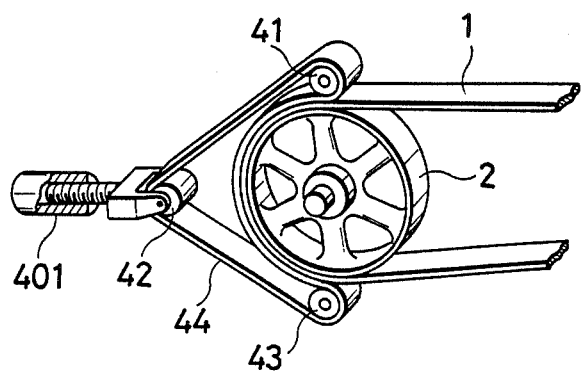
FIG. 1(c) is a perspective view of another adjusting means of this invention.

The wrapping transmission of this invention has a transmission belt 1 and a pair of pulleys, one of which is a driving pulley 2 and the other of which is a driven pulley 3, which engage with the transmission belt 1. The power of the driving pulley 2 is transmitted to the driven pulley 3 by use of a frictional force created between the pulleys 2,3 and the transmission belt 1. The wrapping transmission of this invention further has a means 4 for pressing the back 31 of the transmission belt 1 at the portion, which comes into contact with the driving pulley 2, to the driving pulley 2. The pressing means 4 has a plurality of guide pulleys; for example, three guide pulleys 41, 42 and 43, and a wrapping belt 44 which operably engages with the guide pulleys 41, 42 and 43 in such a manner that a part 440 of the wrapping belt 44 contacts and presses the back 31 of the transmission belt 1 at the portion, which comes into contact with the driving pulley 2. Two of these guide pulleys 41 and 43 are preferably symmetrically positioned about the line L1 drawn through the center c of the driving pulley 2 and the center d of the driven pulley 3. Each center e and f of these pulleys 41 and 43 are also preferably on the line L2 drawn through the center c of the driving pulley 2. The guide pulleys 41 and 43 are preferably close to the driving pulley 2. The guide pulley 42 is positioned at an equal distance from each of said two guide pulleys 41 and 43 and is connected to means 40 for adjusting a pressing force generated by the pressing of the wrapping belt 44 to the transmission belt 1. The pressing force may be reduced by the adjusting means 40 which permits the guide pulley 42 connected thereto to come closer to the driving pulley 2, and it may be increased by the adjusting means 40 which permits the guide pulley 42 to be withdrawn from the driving pulley 2, thereby enabling the desirable adjustment of the pressing force of the wrapping belt 44 against the transmission belt 1. Thus, the pressing force of the transmission belt 1 to the driving pulley 2 may be controlled to the desirable amount. The wrapping belt 44 may be alternatively positioned to engage with the driven pulley 3 when the angle of contact of the transmission belt 1 with the driven pulley 3 is significantly small.

Figure 2:
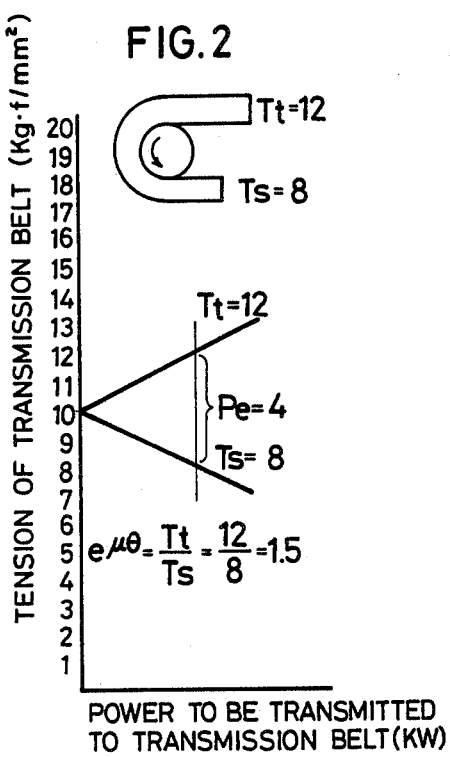
FIG. 2 is a graph showing the maximum transmission power of the transmission belt in the absence of the wrapping belt, wherein the relationship between the tension of the transmission belt and the power to be transmitted to the transmission belt is illustrated.

The use of the wrapping belt 44 creates a stronger transmission power for the transmission belt 1 for the following reasons:

(1) In the absence of the wrapping belt (FIG. 2):

The tension of the transmission belt in cessation of the belt drive is equal to its own tension, which is now given at 10 kg f/mm$^2$. When a load is put on the transmission belt in the belt drive, the tension Tt of the tight side becomes 12 kg f/mm$^2$ (Tt=12) and the tension Ts of the lax side becomes 8 kg f/mm$^2$ (Ts=8). The maximum transmission power Pe of the transmission belt is shown as follows: Pe=Tt−Ts. Thus, Pe=4(KW). The limit of the maximum transmission power is a function $e^{\mu\theta}$ of an angle $\theta$ of the contact of the transmission belt with the driving pulley and a friction factor $\mu$ between the transmission belt and the driving pulley, which is presented by $e^{\mu\theta}=(Tt/Ts)$, wherein e is the base of the natural logarithm. Thus, $e^{\mu\theta}=1.5$.

Figure 3:
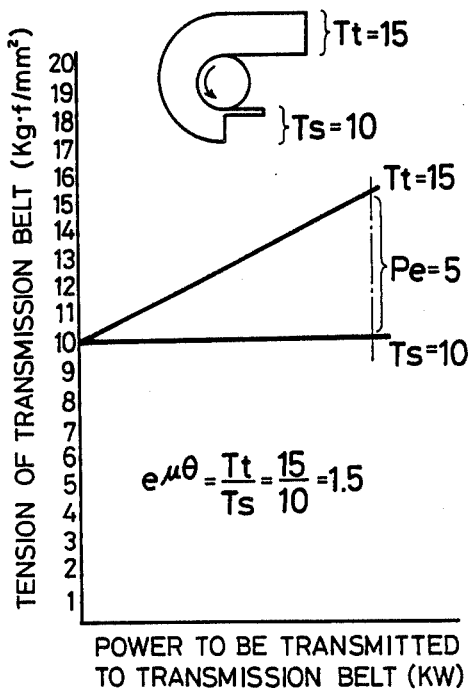
FIG. 3 is a graph showing the maximum transmission power of the transmission belt in the presence of the wrapping belt, wherein the relationship between the tension of the transmission belt and the power to be transmitted to the transmission belt.

(2) In the presence of the wrapping belt (FIG. 3):

The tension Ts of the lax side of the transmission belt maintains at 10 kg f/mm$^2$ due to the pressing force resulting from the pressing of the wrapping belt to the transmission belt. Ts=10 kg f/mm$^2$. Given that the limit $e^{\mu\theta}$ of the maximum transmission power of the transmission belt is the same as that in the absence of the wrapping belt, $e^{\mu\theta}=(Tt/Ts)=1.5$. Tt=1.5 X Ts. Since Ts equals 10 kg f/mm$^2$, Tt equals 15 kg f/mm$^2$. Thus, the maximum transmission power Pe(=Tt−Ts) of the transmission belt becomes 5KW. Pe=5(KW).

Therefore, it is understood that the use of the wrapping belt makes the maximum transmission power stronger.

As the transmission belt 1 travels from a point (a) to a point (b), as shown in FIG. 1(a), it performs as an elastic slide S. The elastic slide S is represented by the following equation:

$$S=[P/(A\cdot E)]$$

wherein

S: an elastic slide of the transmission belt,
T: a transmission power to be transmitted to the belt,
A: a cross sectional area of the belt, and E: Young's modulus of the belt core.

The transmission belt 1 expands at the point (a) due to the tension Tt, and shrinks at the point (b) since the tension Ts at the point (b) is smaller than the tension Tt at the point (a). Thus, the traveling speed of this transmission belt 1 becomes lower as the belt 1 travels from the point (a) to the point (b). This results in a phenomenon of the elastic slide of the transmission belt 1. Given that the transmission belt 1 travels at a speed V, the speed difference between the points (a) and (b) becomes S·V. Since this process involves only pressure upon the transmission belt 1, the wrapping belt 44 is subjected to little load thereon so that the wrapping belt 44 continues to travel at a speed V. Thus, a relative speed difference S·V invariably arises between both belts 1 and 44.

Because of this speed difference, the following drawbacks may be created on both of the belts 1 and 44: (1) The speed difference S·V becomes greater when the transmission belt provides a greater power or travels at a higher speed; (2) The greater speed difference causes wear of both of the belts and generation of frictional heat, resulting in a power loss.

To eliminate the abovementioned drawbacks, the wrapping belt 44 is made of a woven cloth on at least the side which faces the transmission belt 1. The woven cloth contains natural fibers and synthetic fibers, in such a manner that the natural fibers are exposed to a greater extent than the synthetic fibers. The wrapping belt 44 has a woven cloth 45 as a surface material, warp 46 of which is of natural fibers such as cotton or flax and woof 47 of which is of synthetic fibers such as nylon or vinylon. Natural fibers are excellent in heat-resistance and synthetic fibers are excellent in wear-resistance. The natural fibers are exposed on the belt surface to a greater extent than the synthetic fibers; for example, the ratio of the natural fibers to the synthetic fibers ranges from 1 to 16, preferably from 2 to 8. Since the woven cloth is made with the above structure, in addition to its small friction factor in general, the wrapping belt 44 smoothly comes into contact with the transmission belt 1, whereby the generation of heat is reduced and wear is minimized. An example of the friction factor of the wrapping belt according to this invention ranges from about 0.2 to about 0.25, which is significantly smaller than a friction factor ranging from 0.5 to 0.6 of a conventional belt the surface of which consists of rubber or leather. Using nylon fibers for woof 47 is preferable in the case that the belt core 48 is made of nylon, because adhesion strength between the woof 47 and the belt core 48 may be improved.

Figure 4A:
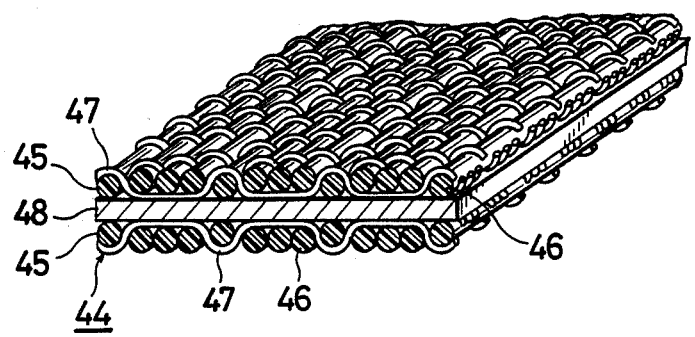
FIG. 4(a) is a perspective view showing a woven cloth of the wrapping belt according to this invention.
Figure 4B:
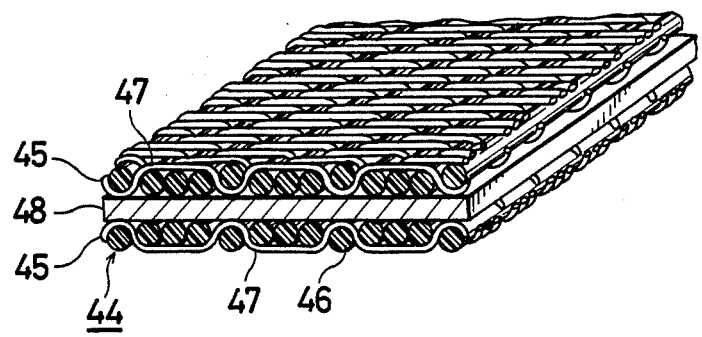
FIG. 4(b) is a perspective view showing another woven cloth of the wrapping belt according to this invention.

Alternatively, as shown in FIG. 4(b), the use of synthetic fibers for the warp 46 and the use of natural fibers for the woof 47 result in an improved strength of the woven cloth 45 because the synthetic fibers are superior in tensile strength.

The use of the woven cloth of the same structure as the abovementioned for the side of the wrapping belt 44 which does not face the transmission belt 1, as shown in FIGS. 4(a) and 4(b), is preferable in that possible friction between the wrapping belt 44 and the guide pulleys 41, 42 and 43 may be also minimized.

We claim:

1. A wrapping transmission, comprising:
a flat transmission belt;
a pair of pulleys including a driving pulley and a driven pulley, which engage the flat transmission belt; and
a means for pressing the flat transmission belt to the driving pulley at a portion of the transmission belt which comes into contact with the driving pulley, said pressing means having a plurality of guide pulleys, a flat wrapping belt which operably engages the guide pulleys such that a part of the flat wrapping belt contacts and presses the back of the flat transmission belt over the entire portion of the transmission belt which comes into contact with the driving pulley, and an adjusting means, connected to one of the guide pulleys, for adjusting a pressing force generated by the pressing of the flat wrapping belt to the flat transmission belt, thereby adjusting the pressing force of the flat transmission belt to the driving pulley, said flat wrapping belt being a woven cloth, which contains natural fibers constituting the warp and synthetic fibers constituting the woof on at least its surface in engagement with the flat transmission belt, and in which the natural fibers are exposed to a greater extent than the synthetic fibers.

2. A wrapping transmission according to claim 1, wherein the number of said guide pulleys is three.

3. A wrapping transmission according to claim 1, wherein two of said guide pulleys are symmetrically positioned about a line drawn through each center of both the driving pulley and the driven pulley and are on a line drawn through the center of the driving pulley and perpendicular to said line through the centers of said driving and driven pulleys, and the other of said guide pulleys connected to said adjusting means, is positioned at an equal distance from each of said two guide pulleys.

4. A wrapping transmission according to claim 1, wherein said adjusting means is a cylinder.

5. A wrapping transmission according to claim 1, wherein said adjusting means is a screw thread.

6. A wrapping transmission according to claim 1, wherein said natural fibers are of cotton.

7. A wrapping transmission according to claim 1, wherein said natural fibers are of flax.

8. A wrapping transmission according to claim 1, wherein said synthetic fibers are of nylon.

9. A wrapping transmission according to claim 1, wherein said synthetic fibers are of vinylon.

10. The wrapping transmission of claim 1, wherein the ratio of natural fibers to synthetic fibers on at least the surface in engagement with the flat transmission belt is in the range from 2:1 to 8:1.

* * * * *